United States Patent
Nishi et al.

(10) Patent No.: US 11,663,210 B2
(45) Date of Patent: May 30, 2023

(54) DATA PATTERN ANALYSIS OPTIMIZER, AND METHOD OF DATA PATTERN ANALYSIS OPTIMIZATION PROCESSING

(71) Applicants: Kabushiki Kaisha Toshiba, Minato-ku (JP); Toshiba Digital Solutions Corporation, Kawasaki (JP)

(72) Inventors: Kazuyoshi Nishi, Fuchu (JP); Shigeaki Sakurai, Yokohama (JP)

(73) Assignees: Kabushiki Kaisha Toshiba, Tokyo (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 728 days.

(21) Appl. No.: 15/134,631

(22) Filed: Apr. 21, 2016

(65) Prior Publication Data

US 2016/0232205 A1    Aug. 11, 2016

Related U.S. Application Data

(63) Continuation of application No. PCT/JP2014/076383, filed on Oct. 2, 2014.

(30) Foreign Application Priority Data

Nov. 1, 2013   (JP) ............................. JP2013-228705

(51) Int. Cl.
    *G06F 16/2453*     (2019.01)
    *G06F 16/28*        (2019.01)
    *G06F 16/2458*     (2019.01)

(52) U.S. Cl.
    CPC .... *G06F 16/24537* (2019.01); *G06F 16/2477* (2019.01); *G06F 16/285* (2019.01); *G06F 2218/00* (2023.01)

(58) Field of Classification Search
    CPC ......... G06F 17/30454; G06F 16/24537; G06F 16/285
See application file for complete search history.

(56) References Cited

U.S. PATENT DOCUMENTS 6,304,888 B1 *  10/2001   Mizuta .................... G06F 17/10
                                              708/250
2006/0106797 A1 *  5/2006   Srinivasa ............... G06N 3/086
2008/0126347 A1 *  5/2008   Mori ................. G06F 17/30539

FOREIGN PATENT DOCUMENTS

JP     2008-159015     7/2008
JP     2012-88880      5/2012

OTHER PUBLICATIONS

International Search Report dated Oct. 28, 2014 in PCT/JP2014/076383, filed Oct. 2, 2014 (with English Translation).

(Continued)

*Primary Examiner* — Jensen Hu
(74) *Attorney, Agent, or Firm* — Maier & Maier, PLLC

(57) ABSTRACT

An embodiment of a data pattern analysis optimizer includes a time sequence data memory, an estimator, a grouping unit, and a time sequence pattern extractor. The time sequence data memory stores a plurality of time sequence data made from items in time order. The estimator estimates the upper limit of the total number of types of time sequence patterns present in the time sequence data at a rate higher than a minimum support level, based on a respective rate of presence of each item, wherein each of the time sequence patterns present in the time sequence data is a predefined number of items. In case that the estimated upper limit exceeds an upper limit of the number of types of time sequence patterns as a maximum processing load to a computer, the grouping unit groups a plurality of time sequence data into sub-groups, based on a group of items having the increased number of items and gives the estima- (Continued)

tor instructions to perform estimation. The time sequence pattern extractor gives the computer instructs to extract the time sequence patterns for each of the sub-groups, in case that the estimated upper limit does not exceed the upper limit of the number of time sequence patterns.

8 Claims, 9 Drawing Sheets

(56) References Cited

OTHER PUBLICATIONS

Rakesh Argawal et al. "Fast Algorithms for Mining Association Rules", Proceedings of the 20$^{th}$ VLDB Conference, Santiago, Chile, 1994, 16 pages.

Kazuo Goda et al. "Resources on Demand for Parallel Database Processing Using Shared Storage Pool", IEICE Technical Report, vol. 102, No. 375, Oct. 10, 2002, 7 pages (with English Abstract and Partial English Translation).

Masahisa Tamura et al. "Dynamic Load Balancing for Parallel Mining Associatin Rules on Hetergeneous PC Cluster", IEICE Technical Report, vol. 98, No. 572, Jan. 29, 1999, 9 pages (with English Abstract and Partial English Translation).

* cited by examiner

FIG. 2

```
TIME     STATE
12:00    STATE_STARTUP
12:02    STATE_DURING STARTUP
12:04    STATE_WARNING 1
12:06    STATE_STARTUP COMPLETE
12:07    STATE_STANDBY
12:09    STATE_WARNING 2
12:12    STATE_ALARM 1
```
~30

FIG. 3

```
STATE_WARNING 1
STATE_WARNING 2
STATE_ALARM 1
```
~35

DATA PATTERN ANALYSIS OPTIMIZER, AND METHOD OF DATA PATTERN ANALYSIS OPTIMIZATION PROCESSING

TECHNICAL FIELD

Embodiments of the present invention relate to a data pattern analysis optimizer and a method of data pattern analysis optimization processing.

BACKGROUND

When extracting time sequence patterns from large scale time sequence data, memory consumption increases due to increase in load of processing, wherein the increase in the processing load is caused by increasing the number of patterns. This will result in that difficulty of high speed analysis processing such as in time-consuming analysis processing. There is available parallel distributed processing to extract time sequence patterns, wherein a plurality of time sequence data is equally grouped into sub-groups of the time sequence data.

As FIG. 10 illustrates, if time sequence pattern extraction processing is performed after time sequence data is divided in equivalent groups, certain groups may have more patterns than others, the extraction processing load increases corresponding to a number of types of time sequence pattern, and processing time may also lengthen. Prior art includes JP 2012-88880 and JP 2008-159015.

SUMMARY

An issue to be solved by the present invention is to provide a data pattern analysis optimizer, and a method of data pattern analysis optimization, capable of grouping time sequence data so as to avoid that the load of extraction from one or more sub-groups is significantly higher than that of the other sub-group or sub-groups.

An embodiment of a data pattern analysis optimizer includes a time sequence data memory, an estimator, a grouping unit, and a time sequence pattern extractor. The time sequence data memory stores a plurality of time sequence data made from items in time order shown by attributes and attribute values. The estimator estimates the upper limit of the total number of types of time sequence patterns present in the time sequence data at a rate higher than a minimum support level, based on a respective rate of presence of each item, wherein each of the time sequence patterns present in the time sequence data is a predefined number of items. The grouping unit increases the predefined number of items, in case that the upper limit estimated by the estimator exceeds an upper limit of the number of types of time sequence patterns as a maximum processing load to a computer. The grouping unit groups a plurality of time sequence data into sub-groups of time sequence data, based on a group of items having the number of items increased by the grouping unit. The grouping unit gives the estimator instructions to perform estimation based on the number of items increased by the grouping unit. The time sequence pattern extractor gives the computer instructions to extract the time sequence patterns for each of the sub-groups, in case that the upper limit estimated by the estimator does not exceed the upper limit of the number of types of time sequence patterns.

BRIEF DESCRIPTION OF THE DRAWINGS

FIG. 2 is a diagram illustrating an example of time sequence data stored in a time sequence data memory.

FIG. 3 is a diagram illustrating an example of a time sequence pattern extracted from time sequence data by time sequence pattern extraction processing.

DETAILED DESCRIPTION (DETAILED DESCRIPTION)

Figure 1:
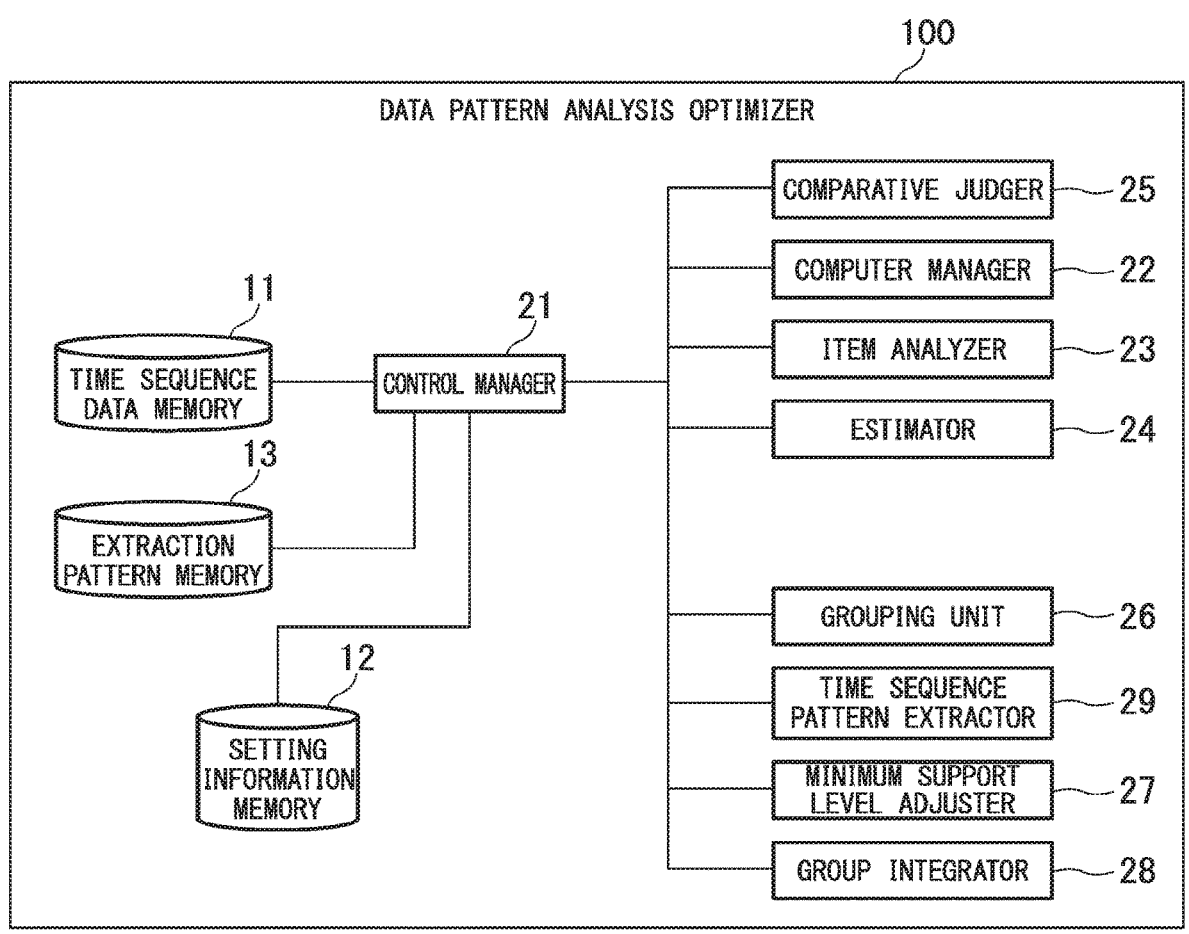
FIG. 1 is a block diagram illustrating a configuration of a data pattern analysis optimizer of an embodiment.

Embodiments of a data pattern analysis optimizer and a method of data pattern analysis optimization processing are explained below with reference to the drawings.

A data pattern analysis optimizer of an embodiment groups time sequence data into sub-groups when there is a plurality of time sequence data to undergo time sequence pattern extraction processing. Time sequence data is a collection of data made up of time data and items occurring at times shown by the time data (refer to FIG. 2 described below). Items are the least amount of elements of data that are included in time sequence data, and include attributes and attribute values. An attribute may be such as a state, a temperature, or a humidity level, and respective attribute values may be "abnormality 1", "20° C.", "80%", or the like. Items are described as "attribute_attribute value" below. A time sequence data sub-group is a group of data taken together for performing time sequence pattern extraction processing, wherein one or more computers divide time sequential pattern extraction processes for respectively performing parallel distributed processing. The computer extracts, as time sequence patterns, sequences of items present in time sequence data at a rate equal to, or greater than, a fixed minimum support level (refer to FIG. 3 described below).

To divide a group of time sequence data into sub-groups of time sequence data, the data pattern analysis optimizer does divide a group of time sequence data into sub-groups of time sequence data units and does not divide each unit of time sequence data in term of time sequence, or does not divide time sequence data unit. Note that one time sequence data unit can be optionally defined. One unit of time sequence data may be data made from items collected by one piece of equipment (manufacturing apparatus, medical device, computer device, or the like) or a sensor over a predefined time period such as one day or one month, or during operations performed by one operator. Further, one time sequence data unit may also be data made from items collected by one or more pieces of equipment or sensor for one target (person, vehicle, or the like) over a predefined time period, or while the target moves from one location to another location.

The data pattern analysis optimizer estimates the number of types of time sequence patterns to decide how to divide the group of time sequence data and does not simply divide, without estimate, the group of time sequence data into sub-groups, before making computer perform time sequence pattern extraction processing from the sub-groups of time sequence data. The number of types of time sequence patterns is a total number of types of time sequence patterns that will be targets for extraction from time sequence data, by the time sequence pattern extraction processing. Based on the estimated number of types of time sequence patterns, the data pattern analysis optimizer divides the group of time sequence data into sub-groups of time sequence data, provided that the sub-groups are so small in size as to allow the one or more computers to perform time sequence pattern extraction processing, and further the data pattern analysis optimizer integrates the sub-groups, and adjusts the minimum support level.

When estimating the number of types of time sequence patterns present in the time sequence data (referred to as "number of types of patterns present in the time sequence data" below), the data pattern analysis optimizer computes a present frequency of time sequence pattern containing a specific item, provided that the specific-item-containing time sequence pattern is so small in size as to allow the one or more computers to perform the time sequence pattern extraction processing, and to allow estimates of upper limit and lower limit of a number of types of patterns present in the time sequence data using the computed present frequency. The data pattern analysis optimizer divides the group of time sequence data into sub-groups of time sequence data including the specific-item-containing pattern, integrates the sub-groups, or adjusts the minimum support level, based on the estimated upper limit and lower limit of a number of types of patterns present in the time sequence data. The data pattern analysis optimizer gives one or more computers instructions to extract a time sequence pattern from appropriate sub-groups of the time sequence data, wherein the appropriate sub-groups are as input data units.

FIG. 1 is a block diagram illustrating a configuration of a data pattern analysis optimizer of an embodiment. FIG. 1 illustrates extraction of only functional blocks relating to the present embodiment. A data pattern analysis optimizer 100 may be implemented by a computer device connected to one or more computers that execute time sequence pattern extraction processing, for example. The data pattern analysis optimizer 100 may also be implemented by a computer for executing time sequence pattern extraction processing. As FIG. 1 illustrates, the data pattern analysis optimizer 100 includes a time sequence data memory 11, a setting information memory 12, an extraction pattern memory 13, a control manager 21, a computer manager 22, an item analyzer 23, an estimator 24, a comparative judger 25, a grouping unit 26, a minimum support level adjuster 27, a group integrator 28, and a time sequence pattern extractor 29.

The time sequence data memory 11 stores collected time sequence data for analysis. The time sequence data can have an arbitrary format that is not dependent upon a specific format such as CCSV or Key Value formats. Time sequence data for analysis that is input into one or more computers is stored temporarily in the time sequence data memory 11. The setting information memory 12 stores various types of setting information. The extraction pattern memory 13 stores time sequence patterns extracted by time sequence pattern extraction processing performed by one or more computers. For example, a time sequence pattern may be stored in a CSV format.

The control manager 21 includes a control function that delivers execution instructions for various functional portions, and data. The computer manager 22 includes a function for managing one or more computers that executes time sequence pattern extraction processing. The control manager 21 estimates the number of types of time sequence patterns, which causes the load to the upper limit, where the load is to each of the one or more computers in performing the time sequence pattern extraction processing. An example of the upper limit may be at least 80% as computer memory usage percentage. The control manager 21 also estimates the number of types of time sequence patterns, which causes the load to the lower limit, where the load is to each of the one or more computers in performing the time sequence pattern extraction processing. An example of the lower limit may be at most 20% as computer memory usage percentage. A number of types of time sequence patterns for cases when the computer memory usage percentage is equal to or greater than the high load standard is referred to hereinafter as an "upper limit of the number of types of patterns for the computer." A number of types of time sequence patterns for cases when the computer memory usage percentage is equal to or less than the low load standard is referred to hereinafter as a "lower limit of the number of types of patterns for the computer".

The item analyzer 23 detects items from all of the time sequence data, and computes an item frequency. The item frequency is a percentage of the number of item-containing time sequence data units to the number of all units of all of the time sequence data. The estimator 24 computes an expected value of the number of types of time sequence patterns (effective time sequence patterns present at a rate higher than the minimum support level) present in time sequence data based on each item frequency computed by the item analyzer 23. The estimator 24 estimates upper limit and lower limit of the number of types of patterns present in time sequence data based on the computed expected value. The comparative judger 25 makes a comparative judgment between an estimated upper limit and lower limit of the number of types of patterns present in time sequence data, and the upper limit and the lower limit of the number of types of patterns for the computer. Grouping time sequence data, sub-group integration, or adjustments to the minimum support level are executed based on the comparative judgment results.

The grouping unit 26 groups time sequence data stored in the time sequence data memory 11 into sub-groups for input into each computer in order to make the memory usage percentage in a single computer equal to or less than a predefined value (80% in this embodiment). The grouping unit 26 divides the group of time sequence data into sub-groups of time sequence data at time sequence data unit, so that each of the sub-groups includes at least one sequence item, wherein each sequence item is a respective group of items which have a respective time sequence order. The minimum support level adjuster 27 adjusts a minimum support level that is a processing threshold for truncation used by time sequence pattern extraction. When adjusting the minimum support level, the minimum support level adjuster 27 lowers the minimum support level based on an initial value of the minimum support level and on setting steps (diminution of one reduction). The group integrator 28 integrates sub-groups of time sequence data for input to a computer so as to increase the memory usage percentage up to at least a specified value (20% in this embodiment).

The time sequence pattern extractor 29 makes one or more computers extract time sequence pattern from time sequence data units (sub-group) grouped by the grouping unit 26. The time sequence pattern extractor 29 may make computers perform time sequence pattern extraction processing by parallel distributed processing, and may also make one or more computers perform time sequence pattern extraction processing sequentially.

FIG. 2 is a diagram illustrating an example of time sequence data stored in the time sequence data memory 11. Time sequence data 30 illustrated in FIG. 2 is an example of operation log data for a manufacturing apparatus. "State" is an attribute of items included in the time sequence data 30 illustrated in FIG. 2. An attribute value at a time "12:00" is "startup", and an attribute value at a time "12:02" is "during startup". An attribute value at a time "12:04" is "warning 1".

FIG. 3 is a diagram illustrating an example of a time sequence pattern extracted from time sequence data by time sequence pattern extraction processing. A time sequence pattern 35 illustrated in FIG. 3 is an example of a time sequence pattern extracted from the time sequence data 30, which is operation log data for a manufacturing apparatus illustrated in FIG. 2. The time sequence pattern 35 is a pattern where items "State_warning 1", "State_warning 2", and "State_alarm 1" occur in time order.

Operation performed by the data pattern analysis optimizer 100 is explained next.

Figure 4:
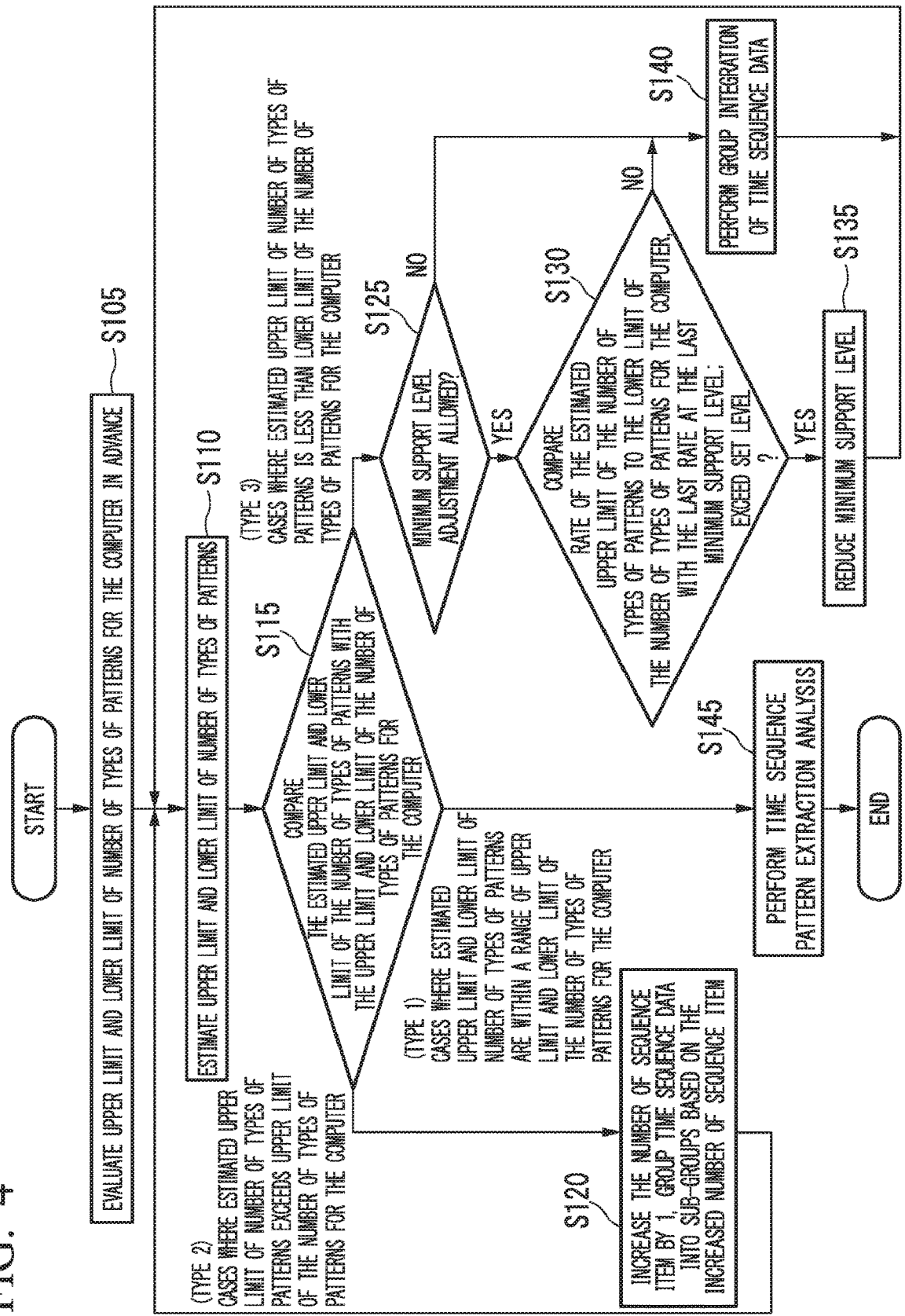
FIG. 4 is a flowchart illustrating data pattern analysis optimization processing which are performed by a data pattern analysis optimizer.

FIG. 4 is a flowchart illustrating data pattern analysis optimization processing which are performed by a data pattern analysis optimizer 100. Time sequence data to be analyzed is stored in advance in the time sequence data memory 11. Further, an initial value of the number of all items included in a sequence item, an initial value of a minimum support level, a set step for the minimum support level, and an initial setting for whether or not to permit adjustment of the minimum support level are stored in advance in the setting information memory 12.

First, the computer manager 22 evaluates upper limit and lower limit of a number of types of patterns for the computer that executes pattern extraction processing (a step S105). The upper limit of the number of types of patterns for the computer is a number of types of time sequence patterns, which causes the load to the upper limit set in advance (set at a memory usage percentage of 80% in the present embodiment), where the load is to each of the one or more computers in performing the time sequence pattern extraction processing. Further, the lower limit of the number of types of patterns for the computer is a number of types of time sequence patterns, which causes the load to the lower limit set in advance (set at a memory usage percentage of 20% in the present embodiment), where the load is to each of the one or more computers in performing the time sequence pattern extraction processing. For example, the computer manager 22 gives computer instructions to execute pattern extraction processing using a multiple of evaluation time sequence data, wherein the numbers of types of time sequence patterns present in the multiple of evaluation time sequence data are different and known. The computer manager 22 receives measurement results for memory usage percentage from the computer. The computer manager 22 may then evaluate the upper limit and the lower limit of the number of types of patterns for the computer based on statistical evaluation of the received measurement results. The computer manager 22 stores evaluation results in the setting information memory 12.

Next, the data pattern analysis optimizer 100 estimate upper limit and lower limit of the number of types of patterns present in the time sequence data (a step S110). Details of estimation processing are explained below using FIG. 9.

Next, the comparative judger 25 compares the upper limit and the lower limit of the number of types of patterns present in the time sequence data estimated in the step S110 with the upper limit and the lower limit of the number of types of patterns for the computer evaluated in advance in the step S105 (a step S115).

Figure 5:
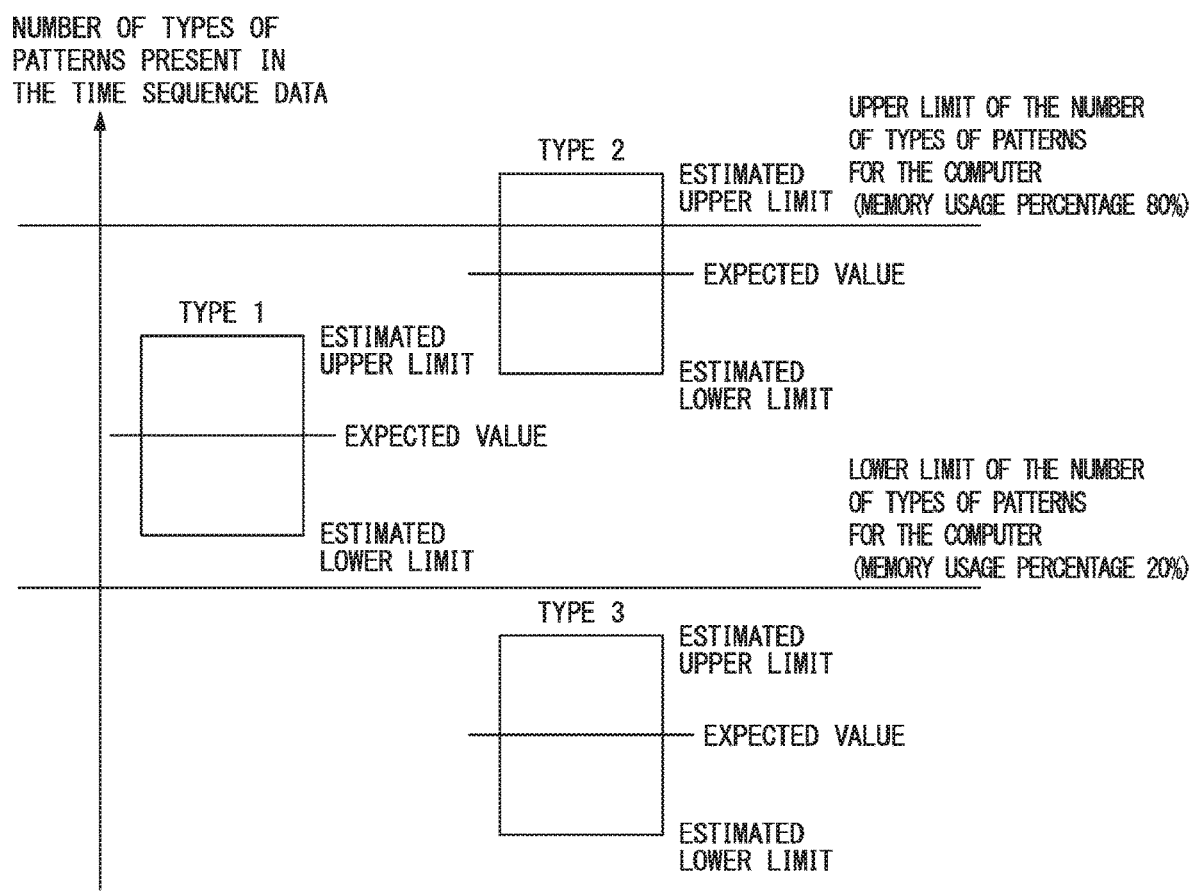
FIG. 5 is a diagram for explaining comparative judgment processing by a comparative judger.

FIG. 5 is a diagram for explaining comparative judgment processing by the comparative judger 25. Comparative judgment results are divided into three cases below, a type 1, a type 2, and a type 3.

Type 1 is a case where the estimated upper limit and lower limit of the number of types of patterns present in the time sequence data are within the upper limit and the lower limit of number of types of patterns for the computer. Type 2 is a case where the estimated upper limit of the number of types of patterns present in the time sequence data exceeds the upper limit of the number of types of patterns for the computer. Type 3 is a case where the estimated upper limit of the number of types of patterns present in the time sequence data is less than the lower limit of the number of types of patterns for the computer. Expected values shown in FIG. 5 are expected number of types of time sequence patterns extracted by time sequence pattern extraction processing, wherein the expected value is calculated by taking the frequency of a sequence item present in time sequence data as 1 when the sequence item present at a rate higher than the minimum support level, and as 0 when less than the minimum support level. The expected values show deviation. The estimated upper limit and the estimated lower limit of the number of types of patterns present in the time sequence data, which is a deviation range, are thus computed based on the expected values.

Figure 6:
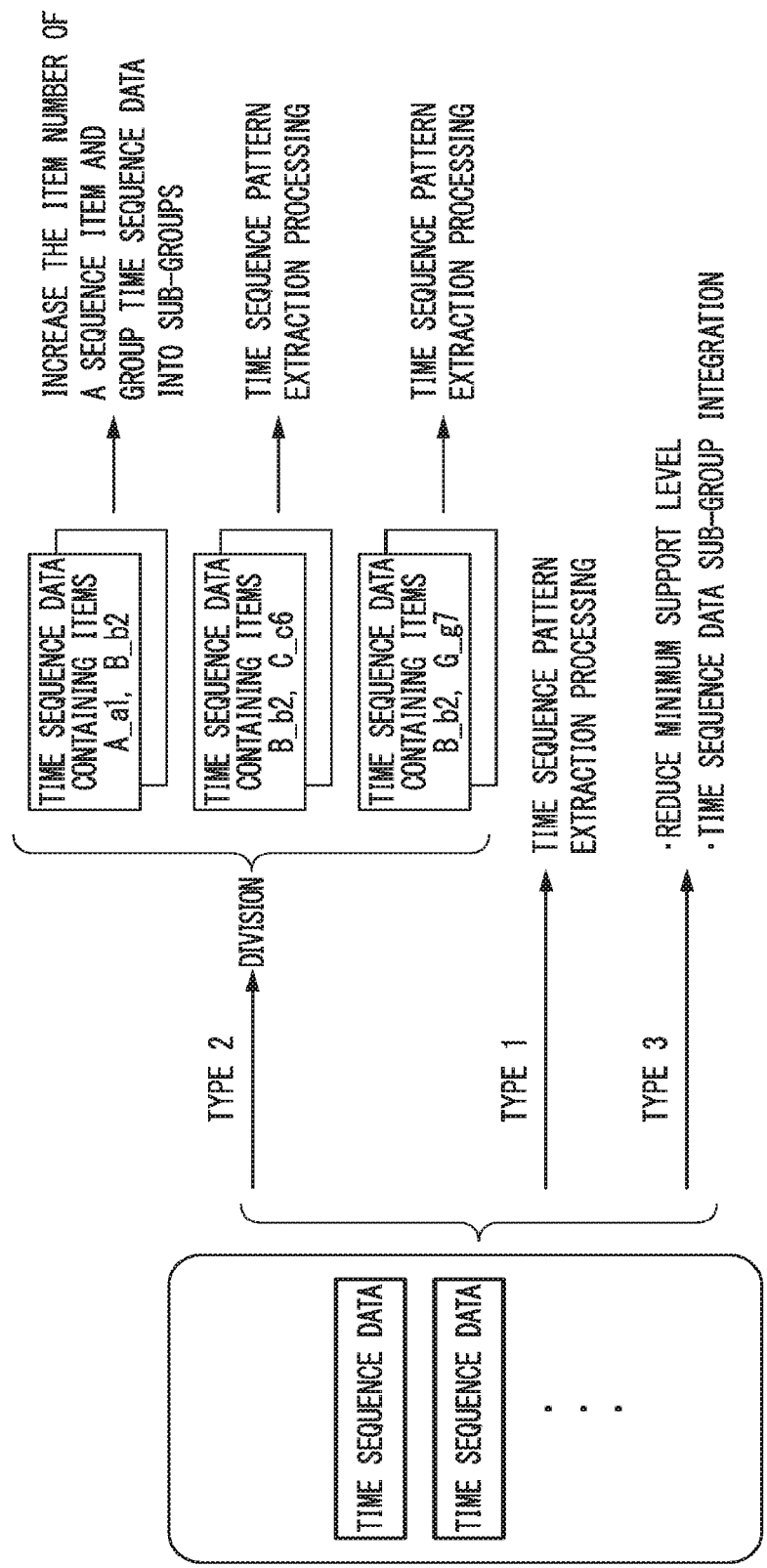
FIG. 6 is a diagram for explaining an example of results of judgment processing by a comparative judger and operations for processing time sequence data.

FIG. 6 is a diagram for explaining an example of results of judgment processing by the comparative judger 25 and operations for processing time sequence data. When the comparative judger 25 judges a case to be type 1, the data pattern analysis optimizer 100 gives one or more computers instructions to extract time sequence patterns from current sub-groups. When the comparative judger 25 judges a case to be type 2, the upper limit of the number of types of patterns for the computer is exceeded, and the data pattern analysis optimizer 100 thus groups time sequence data into sub-groups. The data pattern analysis optimizer 100 increases the item number of a sequence item and groups time sequence data including each sequence item, wherein a sequence item made from items of the increased item number. By increasing item number of a sequence item by 1, constraint conditions are tightened, and the number of sub-groups thus increases. After grouping, the data pattern analysis optimizer 100 again performs grouping of time sequence data when a type 3 judgment is made, and gives one or more computers instructions to extract time sequence pattern when a type 1 judgment is made. Further, when the comparative judger 25 judges a case to be type 3, the data pattern analysis optimizer 100 either reduces the minimum support level or performs time sequence data sub-group integration.

If the comparative judger 25 judges a case to be type 2 in the step S115 of FIG. 4, the grouping unit 26 increases the current item number of a sequence item stored in the setting information memory 12 by 1, and groups time sequence data based on the increased number of sequence item (a step S120).

Figure 7:
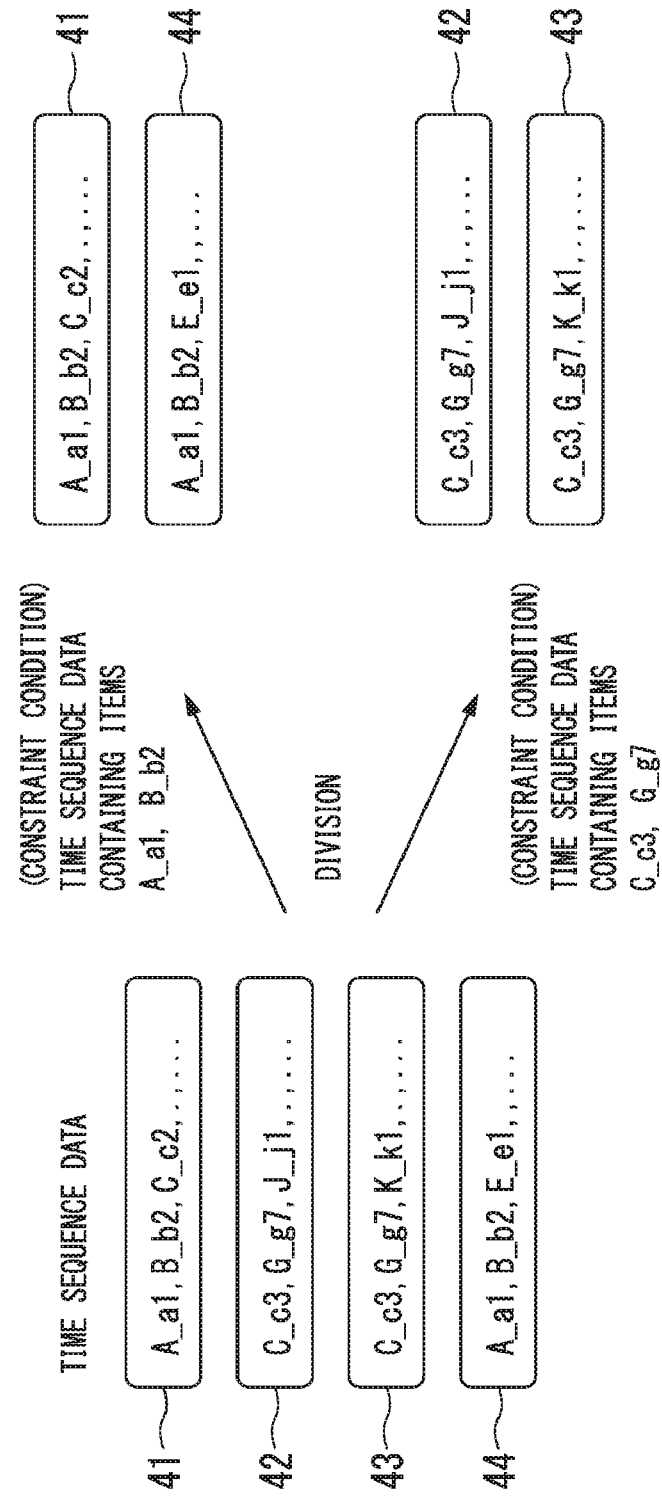
FIG. 7 is a diagram for explaining grouping processing of time sequence data by a grouping unit.

FIG. 7 is a diagram for explaining grouping of time sequence data by the grouping unit 26. In FIG. 7, the grouping unit 26 divides time sequence data 41, 42, 43, and 44 into a sub-group made from the time sequence data 41 and 44, containing sequence items A_a1 and B_b2, and a group made from the time sequence data 42 and 43 containing sequence items C_c3 and G_g7.

The grouping unit 26 may also take sequence items input by a user as constraint condition sequence items, and may also select constraint condition sequence items based on their present frequency in time sequence data. When making selections based on present frequency, the grouping unit 26 may take, for example, a combination of items having a low present frequency and items having a high present frequency as constraint condition sequence items. A specific example is as follows. When an item number of a sequence item is 2, the grouping unit 26 may combine an item having the highest present frequency with an item having the lowest present frequency, combine an item having the second highest present frequency with an item having the second lowest present frequency, and so forth, thus generating sequence items. Alternatively, when making selections based on present frequency, the grouping unit 26 may also use a respective combination of increased number of items which form a respective sequence item, provided that a maximum difference among multiplying results is within a predefined difference, so that the multiplying results are as close to each other as possible, wherein each of the multiplying results is a respective result of multiplying present frequencies of the increased number of items in the respective combination. The frequency of each item computed in the step S205 of FIG. 9, described below, can be used for present frequency. As described above, for example, when a current item number n is increased by one for forming an item number (n+1), the grouping unit 26 may generate, as constraint conditions, sequence items from (n+1) items in the combination, without utilizing the sequence items used previously as constraint conditions. Differently from the above-described methods, the grouping unit 26 may generate, as constraint conditions, sequence items from (n+1) items, wherein the (n+1)th item is added to the n-items of the (n+1) items, where the n-items were previously used for the past constraint conditions.

After grouping, the grouping unit 26 instructs the estimator 24 to estimate upper limit and lower limit of the number of types of patterns present in the time sequence data based on the increased item number of a sequence item. The data pattern analysis optimizer 100 thus transitions to processing of the step S110 of FIG. 4.

If the comparative judger 25 judges a case to be type 3 in the step S115, a judgment is made as to whether or not the initial setting stored in the setting information memory 12 permits adjustment to the minimum support level (a step S125). If the comparative judger 25 judges that the setting allows minimum support level adjustment, the minimum support level adjuster 27 performs processing of a step S130. That is, the minimum support level adjuster 27 computes a rate of the currently estimated upper limit of the number of types of patterns present in the time sequence data to the lower limit of number of types of patterns for the computer, which is the minimum load to each of one or more computers. The minimum support level adjuster 27 compares the currently computed rate with the last-computed rate, wherein the last-computed difference was calculated at the last minimum support level, and determines whether or not a difference of the currently computed rate from the last-computed rate is greater than a previously defined level (the step S130). For cases where the difference is greater than the level set in advance, or for cases where the minimum support level has not yet been adjusted, the minimum support level adjuster 27 reduces the current minimum support level stored in the setting information memory 12 by 1 step based on the set step set in advance in the setting information memory 12 (a step S135). For example, the minimum support level adjuster 27 lowers the current minimum support level from 0.3 by one step of 0.1, thus updating the minimum support level to 0.2

The minimum support level adjuster 27 instructs the estimator 24 to estimate upper limit and lower limit of the number of types of patterns present in the time sequence data based on reduced minimum support level. The data pattern analysis optimizer 100 thus transitions to the step S110 of FIG. 4.

For cases where the comparative judger 25 judges in the step S125 that the initial setting does not permit adjustment of the minimum support level, or for cases where the minimum support level adjuster 27 judges in the step S130 that the difference does not exceed the level set in advance, the group integrator 28 integrates sub-groups of time sequence data (a step S140). When performing integration, the group integrator 28 selects sequence items having a low sequence item frequency, and integrates sub-groups of time sequence data including the selected sequence items. Note that computation of sequence item frequency is explained in the step S210 of FIG. 9, explained blow.

Figure 8:
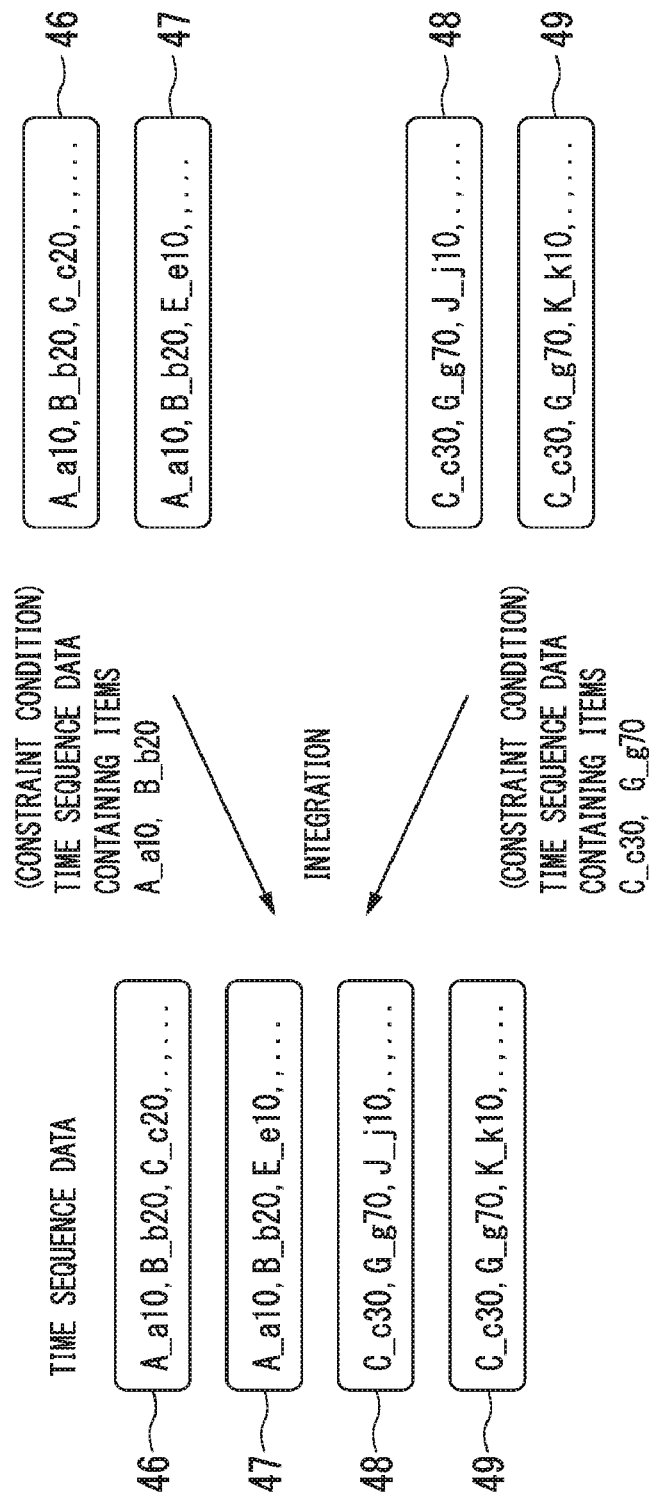
FIG. 8 is a diagram illustrating an example of sub-group integration by a group integrator.
Figure 9:
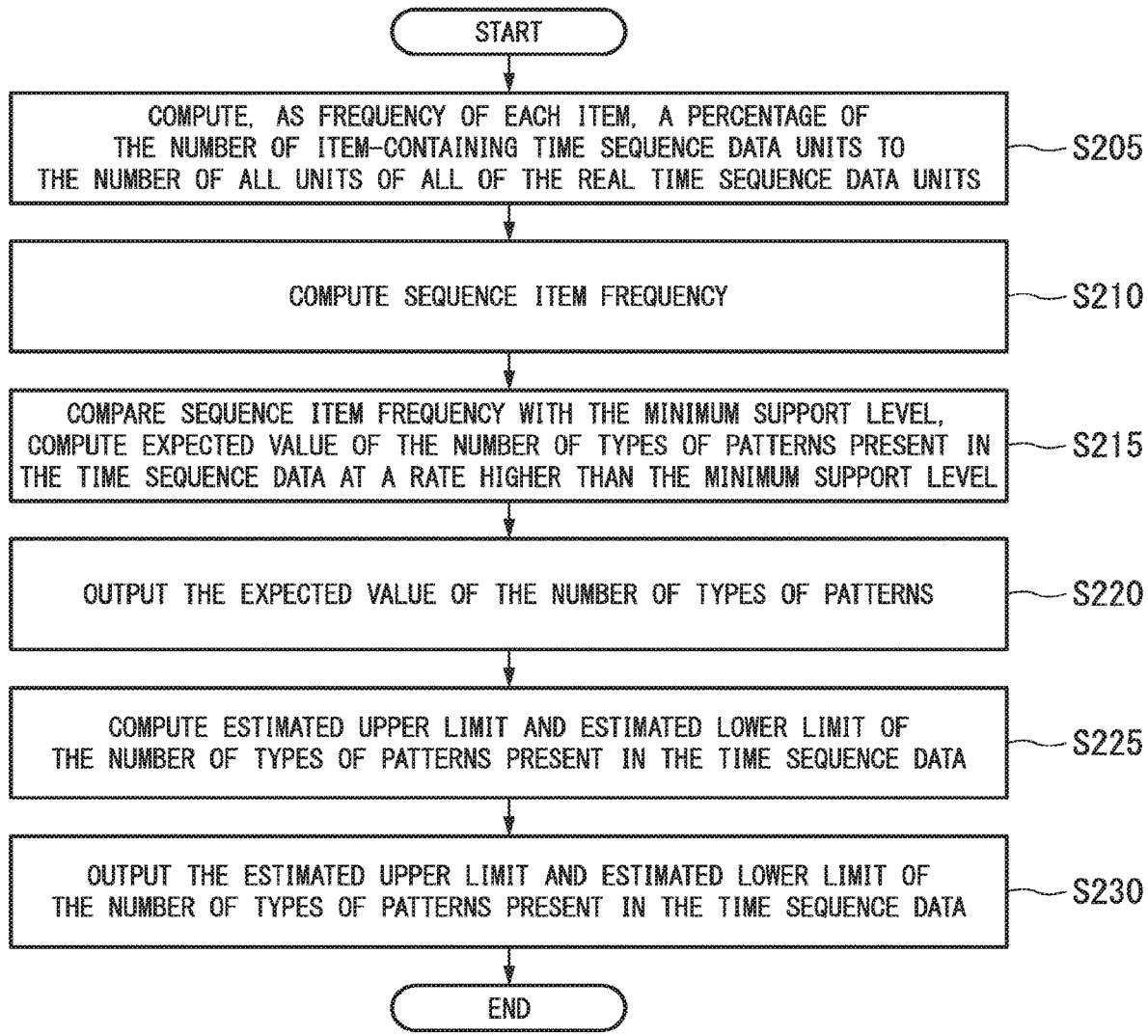
FIG. 9 is a flowchart illustrating operations to estimate an upper limit and a lower limit of a number of types of patterns present in a time sequence data, which are performed by a data pattern analysis optimizer.
Figure 10:
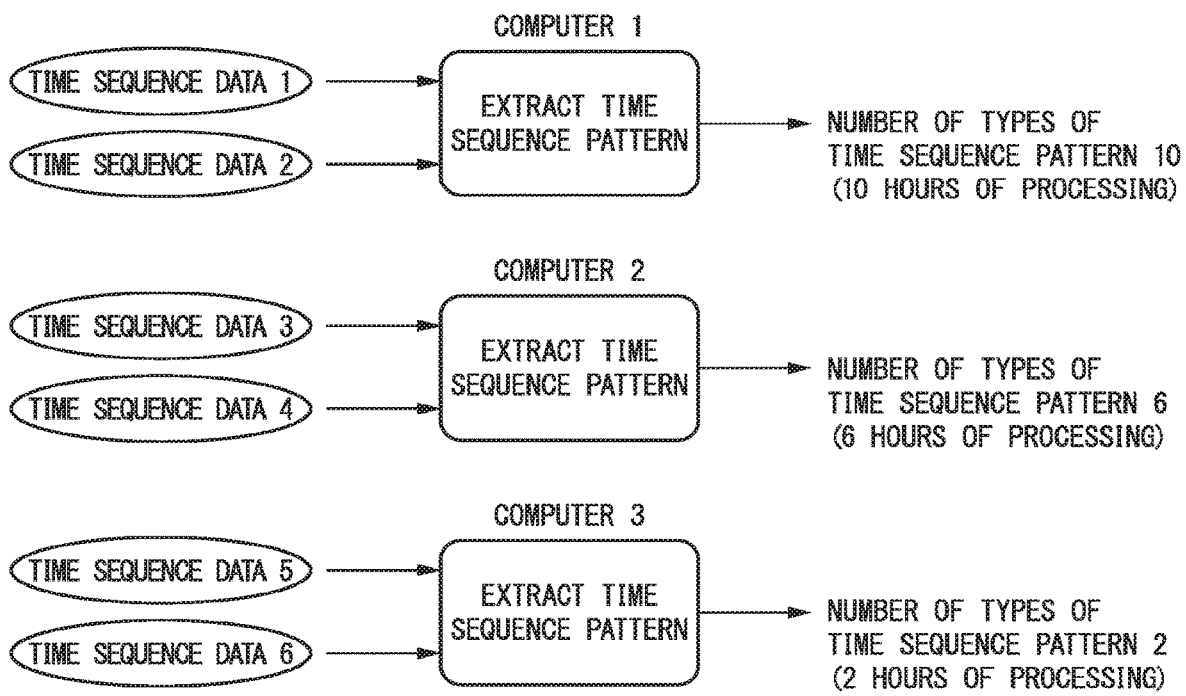
FIG. 10 is a diagram illustrating an example of deviations of a number of types of time sequence pattern when time sequence data is divided in equivalent groups and time sequence patterns are extracted.

FIG. 8 is a diagram illustrating an example of group integration by the group integrator 28. The group integrator 28 combines sequence items having the lowest sequence item frequency and sequence items having the next lowest frequency from sequence items not yet selected for combination. In FIG. 9, the group integrator 28 integrates a sub-group made from time sequence data 46 and 47 containing sequence items A_a10, B_b20, and a sub-group made from time sequence data 48 and 49 containing C_c30 and G_g70, into one sub-group. Note that although the group integrator 28 integrates two sub-groups as its basic setting, the group integrator 28 is also capable of group integration of three or more sub-groups.

After group integration processing the group integrator 28 instructs the estimator 24 to estimate upper limit and lower limit of the number of types of patterns present in the time sequence data included in the sub-group formed by integration, instead of using all the time sequence data. The data pattern analysis optimizer 100 thus performs processing from the step S110 of FIG. 4 for the group formed by integration.

If the comparative judger 25 makes a judgment of type 1 in the step S115, the time sequence pattern extractor 29 makes one or more computers execute time sequence pattern extraction processing (a step S145). The time sequence pattern extractor 29 reads out time sequence data of each sub-group and the current minimum support level set or prepared at the time that the step S145 begins, from the time sequence data memory 11 and from the setting information memory 12, respectively. The time sequence pattern extractor 29 supplies one or more computers with time sequence data in the sub-groups and the minimum support level, and instructs the computers to perform time sequence pattern extraction. For example, when computers perform parallel distributed processing, the time sequence pattern extractor 29 supplies different one or more time sequence data sub-groups and the minimum support level to each computer. The time sequence pattern extractor 29 receives time sequence pattern of a present percentage equal to or greater than the minimum support level. The time sequence pattern is extracted by the computer from time sequence data. The time sequence pattern extractor 29 stores the time sequence pattern in the extraction pattern memory 13. Note that when there is an instruction item from a user, the time sequence pattern extractor 29 also supplies a specified item to the one or more computers. The time sequence pattern extractor 29 receives a time sequence pattern of a present percentage equal to or greater than the minimum support level including the specified item and extracted by one or more computers from time sequence data.

Note that the minimum support level adjuster 27 may compare a currently computed rate with last-computed rate at the last minimum support level value in the step S130, and judge whether or not a change is within a predefined standard. When it is judged that the change is within the predefined standard, the data pattern analysis optimizer 100 performs the processes of the step S140. When it is judged that the change exceeds the predefined standard value, the data pattern analysis optimizer 100 performs the processes of the step S135.

Further, for cases where the comparative judger 25 judges that the initial setting permits adjustment of the minimum support level in the step S125, the minimum support level adjuster 27 may perform the processing of the step S135 without making the judgment of the step S130, and reduce the minimum support level. The minimum support level is this reduced by 1 step at a time by making adjustments of the minimum support level without making a determination using the difference of the currently estimated upper limit of the number of types of patterns present in the time sequence data from the lower limit of the number of types of patterns for the computer. That is, in the present embodiment, it is not always necessary to use the ratio of the currently estimated upper limit of the number of types of patterns present in the time sequence data to the lower limit of the number of types of patterns for the computer.

Further, for cases where the estimated upper limit of the number of types of patterns present in the time sequence data is lower than the upper limit of the number of types of patterns for the computer, and the estimated lower limit of the number of types of patterns present in the time sequence data is less than the lower limit of the number of types of patterns for the computer, the data pattern analysis optimizer 100 may perform the same processing as that done with type 1, and may also perform the same processing as that done with type 3.

For cases where the comparative judger 25 judges that the initial setting does not permit adjustment of the minimum support level in the step S125, or for cases where the minimum support level adjuster 27 judges that the difference does not exceed the level set in advance in the step S130, the data pattern analysis optimizer 100 may also perform the processes of the step S145.

Multiple sub-groups may also be generated by integration by the sub-group integration processing of the step S140. In this case, after sub-group integration processing, the group integrator 28 instructs the estimator 24 to estimate the upper limit and the lower limit of the number of types of patterns present in the time sequence data for each sub-group generated by integration. The data pattern analysis optimizer 100 performs processing from the step S110 of FIG. 4 for each sub-group generated by integration.

FIG. 9 is a flowchart illustrating operations to estimate the upper limit and the lower limit of the number of types of patterns present in the time sequence data, which are performed by the data pattern analysis optimizer 100. FIG. 9 illustrates detailed processes taking place in the step S110 of FIG. 4.

The item analyzer 23 computes the frequency of each item (a step S205). Specifically, the item analyzer 23 may compute, as an item frequency, a percentage of the number of item-containing time sequence data units to the number of all units of all of the time sequence data units stored in the time sequence data memory 11, wherein the item-containing time sequence data unit is a time sequence data unit containing specified items input by a user. Alternatively, the item analyzer 23 may extract all items from all time sequence data stored in the time sequence data memory 11, and compute the frequency of each of the all extracted items. The item analyzer 23 may also select items present in time sequence data at a rate equal to or greater than a predefined frequency, and compute the item frequency for each of the selected items.

For example, the item analyzer 23 may compute the frequency of item X_x1=2/10=0.2 if in the 10 units of time sequence data stored in the time sequence data memory 11, there are present two units of time sequence data including items X_x1. The item analyzer 23 may compute the frequency of item A_a1 as 0.1, the frequency of item B_b2 as 0.2, the frequency of item C_c3 as 0.3, the frequency of item G_g7 as 0.2, and so forth.

Next, the estimator 24 computes, as the frequency of the sequence items, present percentage of each sequence items in the time sequence data by using the current item number of a sequence item stored in the setting information memory 12 (a step S210). For example, when the item number of a sequence item is 2, the estimator 24 may generate all combinations made from two items using all items for which an item frequency is computed in the step S205, and then generate sequence items from the generated combinations. The estimator 24 computes a sequence item frequency by multiplying the item frequencies computed in the step S205 for each item comprising the sequence item. For example, the estimator 24 computes the frequency of sequence item A_a1, B_b2, the frequency of sequence item A_a1, C_c3, and the frequency of sequence item A_a1, item G_g7 as shown by EQ. 1-EQ3 below.

$$\text{Frequency of sequence item A\_a1,} \quad \text{EQ. 1}$$
$$\text{B\_b2} = \text{frequency of item A\_a1}$$
$$(0.1) \times \text{frequency of item B\_b2}(0.2) = 0.02$$

$$\text{Frequency of sequence item A\_a1,} \quad \text{EQ. 2}$$
$$\text{C\_c3} = \text{frequency of item A\_a1}$$
$$(0.1) \times \text{frequency of item C\_c3}(0.3) = 0.03$$

$$\text{Frequency of sequence item A\_a1,} \quad \text{EQ. 3}$$
$$\text{G\_g7} = \text{frequency of item A\_a1}$$
$$(0.1) \times \text{frequency of item G\_g7}(0.2) = 0.02$$

Next, the estimator 24 compares each computed sequence item frequency (value found by multiplying together the frequency of each item comprising the sequence item) and the minimum support level. The estimator 24 computes an expected value of the number of types of patterns present in the time sequence data at a rate higher than the minimum support level, based on the results of comparison (a step S215).

A specific expected value computation method used by the estimator 24 is explained. First, taking p as the frequency of a sequence item, g(p) is taken as a function that returns 1 or 0 for a sequence item as shown in EQ. 4 below.

$$g(p)=1 \text{ when item sequence frequency} \geq \text{minimum support level,}$$

and $$g(p)=0 \text{ when item sequence frequency} < \text{minimum support level} \quad \text{EQ. 4}$$

The estimator 24 computes expected values by EQ. 5 below.

$$\text{expected value} = \Sigma g(p) \quad \text{EQ. 5}$$

The summation range for EQ. 5 is all sequence items generated in the step S215. In other words, the summation range is all of the combinations made from all of the sequence items of the current item number. For example, when the item number of a sequence item is 2 and the minimum support level as 0.03, the expected value is found by EQ. 6 below.

$$\text{expected value} = \quad \text{EQ. 6}$$
$$g(\text{item A\_a1 frequency } (0.1) \times \text{item B\_b2 frequency } (0.2)) +$$
$$g(\text{item A\_a1 frequency } (0.1) \times \text{item C\_c3 frequency } (0.03)) +$$
$$g(\text{item A\_a1 frequency } (0.1) \times \text{item G\_g7 frequency } (0.2)) +$$
$$\ldots = 0 + 1 + 0 + \ldots$$

The estimator 24 outputs the computed expected value (a step S220).

Next, the estimator 24 computes an estimated upper limit and an estimated lower limit of the number of types of patterns present in the time sequence data based on the expected values computed in the step S215 (a step S225). The estimator 24 computes the estimated upper limit of the number of types of patterns present in the time sequence data as in EQ. 7 below.

(Method 1-1)

$$\text{Estimated upper limit} = \text{expected value} \times \text{item number of a sequence item} \quad \text{EQ. 7}$$

For example, when the item number of a sequence item is 2, the estimator 24 computes the estimated upper limit of the number of types of patterns present in the time sequence data as equal to the expected value multiplied by 2 using the method 1-1. Alternatively, the estimator 24 computes the estimated upper limit of the number of types of patterns present in the time sequence data as in EQ. 8 below.

(Method 1-2)

$$\text{Estimated upper limit} = \text{expected value} + f(\text{item number of a sequence item}) \quad \text{EQ. 8}$$

The method 1-1 and the method 1-2 may be used as computation methods for computing the estimated upper limit of the number of types of patterns present in the time sequence data. For time sequence pattern extraction, the item number of a sequence item influences extraction result deviation. With the method 1-1, the expected value is multiplied by the item number of a sequence item and taken as the estimated upper limit of the number of types of patterns present in the time sequence data. With the method 1-2, the function f(item number of a sequence item) taking item number of a sequence item as a variable is added to the expected value to get the estimated upper limit. The function f is one which, for cases where effective sequence items present in time sequence data frequently, calculates the amount of increase in the number of types of patterns present in the time sequence data compared with the expected value, using an item number of a sequence item as a variable.

Further, the estimator 24 may compute the estimated lower limit of the number of types of patterns present in the time sequence data as in EQ. 9 below.

(Method 2-1)

$$\text{Estimated lower limit} = \text{expected value} \times 1/\text{item number of a sequence item} \quad \text{EQ. 9}$$

For example, when the item number of a sequence item is 2, the estimator 24 computes the estimated lower limit of the number of types of patterns present in the time sequence data as equal to the expected value multiplied by ½ using the method 2-1. Alternatively, the estimator 24 computes the estimated lower limit of the number of types of patterns present in the time sequence data as in EQ. 10 below.

(Method 2-2)

$$\text{Estimated lower limit} = \text{expected value} - f(\text{item number of a sequence item}) \quad \text{EQ. 10}$$

The method 2-1 and the method 2-2 may be used as computation methods for computing the estimated lower limit of the number of types of patterns present in the time sequence data. For time sequence pattern extraction, the item number of a sequence item influences extraction result deviation. With the method 2-1, the expected value is multiplied by (1/item number of a sequence item) and taken as the estimated lower limit of the number of types of patterns present in the time sequence data. With the method 2-2, the function f (item number of a sequence item) taking item number of a sequence item as a variable is subtracted from the expected value to get the estimated lower limit. The function f is one which, for cases where effective sequence items present in time sequence data frequently, calculates the amount of decrease in the number of types of patterns present in the time sequence data compared with the expected value, using an item number of a sequence item as a variable.

Note that whether the estimator 24 chooses the method 1-1 and the method 2-1, or chooses the method 1-2 and the method 2-2, is determined by setting information stored in advance in the setting information memory 12. The method 1-2 and the method 2-2 are set as defaults.

The estimator 24 outputs the estimated upper limit and estimated lower limit of the number of types of patterns present in the time sequence data (a step S230).

Note that when performing the processes of the step S110 for the second or greater time after performing the processes of the step S120 or the step S135 of FIG. 4, the processes of the step S205 of FIG. 9 are omitted and processing is performed from the step S210. When computing sequence item frequencies in the step S210, the estimator 24 uses each of the item frequencies computed in the step S205 when performing the processes of FIG. 9 initially. Further, when performing the processes of the step S110 for the second or greater time after performing the processes of the step S140 of FIG. 4, the item analyzer 23 computes, as item frequencies, a percentage of the number of item-containing time sequence data units to the number of units in the sub-group generated by the group integrator 28, wherein the item-containing time sequence data unit is a time sequence data unit containing specified items input by a user.

According to at least one of the embodiments described above, by including the item analyzer 23, the estimator 24, the comparative judger 25, and the grouping unit 26, processing performance degradation due to increases in time sequence pattern types can be avoided and multiple computers can be made to perform time sequence pattern extraction processing in parallel. Processing results can thus be achieved faster than by using conventional means.

Further, according to at least one of the embodiments described above, by including the minimum support level adjuster 27, the minimum support level, which is limit set value for time sequence pattern analysis, can be reduced, avoiding excess increase of the number of types of time sequence patterns. It thus makes it possible to extract highly precise patterns.

Note that a program for achieving functions of the data pattern analysis optimizer 100 of FIG. 1 in each of the embodiments described above may be recorded on a computer readable recording medium. The program recorded on the recording medium may be read in by a computer and executed, thus performing operations of the data pattern analysis optimizer 100. Note that the term computer system includes operating systems, peripheral devices, and the like. Further, the term computer system also includes World Wide Web systems provided with a website provision environment (or a display environment). The term computer readable recording medium means a removable medium such as a flexible disk, an optical magnetic disk, a ROM, a CD-ROM, or the like, and recording devices such as hard disks and the like built into a computer system. In addition, the term computer readable recording medium also includes temporary program storage, such as volatile memory (RAM) in an internal portion of a computer system that becomes a server or client for cases where a program is transmitted through a network such as the Internet, or through a communication line such as a telephone line or the like.

The program may also be transferred from a computer system in which the program is stored in a memory device, or the like, to another computer system through a transfer medium or through a transfer signal within the transfer medium. The transfer medium for transferring the program means a network (communication net) such as the Internet, or a medium having a function for transferring information such as communication line of a telephone line or the like. The program may also be used to achieve a portion of the functions described above. In addition, a program may be combined with another program already stored in a computer system and executed, namely a difference file (differential program).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data pattern analysis optimizer comprising:
   a time sequence data memory that stores a plurality of time sequence data including items in time order shown by attributes and attribute values; and
   at least one processor configured to execute instructions to:
   compute a first frequency of each item, the first frequency indicating a percentage of the number of the time sequence data including a target item among the items to the total number of the plurality of time sequence data;
   compute a second frequency at which each of time sequence patterns is present in the plurality of time sequence data, the second frequency of each of time sequence patterns being calculated by multiplying all of the first frequency corresponding to a predefined sequence number of the items included in the corresponding time sequence pattern;
   compute an expected value of the number of the time sequence patterns at the second frequency by calculating a summation of return values of a predetermined function for each of the time sequence patterns, wherein the minimum support level is a minimum rate of the item occurred in the plurality of time sequence data which is processable by a computer;
   estimate an upper limit of the number of types of time sequence patterns present in the time sequence data at a rate higher than the minimum support level, based on the expected value, each of the time sequence patterns present in the time sequence data includes items, the number of which is the predefined sequence number;
   in a case that the estimated upper limit exceeds an upper limit of the number of types of time sequence patterns processable by the computer, increase the predefined sequence number of items; generate constraint condition for the increased sequence number of items by using at least one item input, by using at least one item selected based on the first frequency, or by adding at least one item to the constraint condition last-generated; group the plurality of time sequence data into sub-groups of time sequence data, based on the constraint condition; estimate an upper limit of the number of types of time sequence patterns based on the increased sequence number of items;
   in a case that the estimated upper limit does not exceed the upper limit of the number of types of time sequence patterns processable by the computer, give the computer instructions to extract time sequence patterns for each of the sub-groups; and
   in a case that the estimated upper limit is less than a lower limit of the number of types of time sequence patterns processable by the computer, reduce the minimum support level by a predefined amount; and estimate an upper limit of the number of types of time sequence patterns based on the minimum support level reduced, and
   wherein the at least one processor is configured to execute instructions to compute the estimated upper limit and the estimated lower limit of the number of types of patterns present in the time sequence data based on the expected values using a first calculation method set and a second calculation method set based on an item number of a sequence item during a time sequence pattern extraction.

2. The data pattern analysis optimizer according to claim 1, wherein:
   the processor is configured to execute the instructions to:
   in a case that the estimated upper limit does not exceed the upper limit of the number of types of time sequence patterns processable by the computer, give the computer instructions to extract time sequence patterns for each of the sub-groups and the minimum support level.

3. The data pattern analysis optimizer according to claim 1, wherein:
the processor is configured to execute the instructions to:
in a case that the estimated upper limit is less than the lower limit of the number of types of time sequence patterns processable by the computer, compute a rate of the estimated upper limit to the lower limit of the number of types of time sequence patterns processable by the computer; compare the currently computed rate with the last computed rate based on the last minimum support level to find a difference of the rate from the last computed rate;
in a case that the difference exceeds a predefined level, reduce the minimum support level by a predefined amount, and estimate an upper limit of the number of types of time sequence patterns based on the minimum support level reduced; and
in a case that the difference is within the predetermined level, integrate two or more sub-groups included in the sub-groups of the time sequence data, and estimate an upper limit of the number of types of time sequence patterns based on the time sequence data included in the two or more sub-groups integrated.

4. The data pattern analysis optimizer according to claim 1, further comprising:
the processor is configured to execute the instructions to:
in a case that the estimated upper limit is less than a lower limit of the number of types of time sequence patterns processable by the computer, integrate a portion of sub-groups of the time sequence data, and estimate an upper limit of the number of types of time sequence patterns based on the time sequence data included in the two or more sub-groups integrated.

5. A method of data pattern analysis optimization processing comprising:
storing a plurality of time sequence data including items in time order shown by attributes and attribute values;
computing a first frequency of each item, the first frequency indicating a percentage of the number of the time sequence data including a target item among the items to the total number of the plurality of time sequence data;
computing a second frequency at which each of time sequence patterns is present in the plurality of time sequence data, the second frequency of each of time sequence patterns being calculated by multiplying all of the first frequency corresponding to a predefined sequence number of the items included in the corresponding time sequence pattern;
computing an expected value of the number of the time sequence patterns at the second frequency by calculating a summation of return values of a predetermined function for each of the time sequence patterns, wherein the minimum support level is a minimum rate of the item occurred in the plurality of time sequence data which is processable by a computer;
estimating an upper limit of the number of types of time sequence patterns present in the time sequence data at a rate higher than the minimum support level, based on the expected value, each of the time sequence patterns present in the time sequence data includes items, the number of which is the predefined sequence number;
in a case that the estimated upper limit exceeds an upper limit of the number of types of time sequence patterns processable by the computer, increasing the predefined sequence number of items; generating constraint condition for the increased sequence number of items by using at least one item input, by using at least one item selected based on the first frequency, or by adding at least one item to the constraint condition last-generated; grouping the plurality of time sequence data into sub-groups of time sequence data, based on the constraint condition; estimating an upper limit of the number of types of time sequence patterns based on the increased sequence number of items;
in a case that the estimated upper limit does not exceed the upper limit of the number of types of time sequence patterns processable by the computer, giving the computer instructions to extract time sequence patterns for each of the sub-groups; and
in a case that the estimated upper limit is less than a lower limit of the number of types of time sequence patterns processable by the computer, and reducing the minimum support level by a predefined amount; estimating an upper limit of the number of types of time sequence patterns based on the minimum support level reduced, and
computing the estimated upper limit and the estimated lower limit of the number of types of patterns present in the time sequence data based on the expected values using a first calculation method set and a second calculation method set based on an item number of a sequence item during a time sequence pattern extraction.

6. The data pattern analysis optimizer according to claim 1, wherein the function returns a value of 1 when the second frequency is equal to or higher than the minimum support level, and the function returns a value of zero when the second frequency is less than the minimum support level.

7. The data pattern analysis optimizer according to claim 1,
wherein the first calculation method set includes:
a method of calculating the estimated upper limit of the number of types of patterns present in the time sequence data by multiplying the expected value by the item number of the sequence item; and
a method of calculating the estimated lower limit of the number of types of patterns present in the time sequence data by multiplying the expected value by a multiplicative inverse of the item number of the sequence item, and
the second calculation method set includes:
a method of calculating the estimated upper limit of the number of types of patterns present in the time sequence data by adding a function taking the item number of the sequence item as a variable to the expected value; and
a method of calculating the estimated lower limit of the number of types of patterns present in the time sequence data by subtracting the function from the expected value,
the function is adopted to calculate a difference indicating a change amount in the number of types of patterns of effective sequence items present in the time sequence data compared with the expected value, and
the first calculation method set or the second calculation method set is selected based on a value of the item number of the sequence item.

8. The method of data pattern analysis optimization processing according to claim 7, wherein the first calculation method set includes:
- a method of calculating the estimated upper limit of the number of types of patterns present in the time sequence data by multiplying the expected value by the item number of the sequence item; and
- a method of calculating the estimated lower limit of the number of types of patterns present in the time sequence data by multiplying the expected value by a multiplicative inverse of the item number of the sequence item, and the second calculation method set includes:
- a method of calculating the estimated upper limit of the number of types of patterns present in the time sequence data by adding a function taking the item number of the sequence item as a variable to the expected value; and
- a method of calculating the estimated lower limit of the number of types of patterns present in the time sequence data by subtracting the function from the expected value, the function is adopted to calculate a difference indicating a change amount in the number of types of patterns of effective sequence items present in the time sequence data compared with the expected value, and the first calculation method set or the second calculation method set is selected based on a value of the item number of the sequence item.

* * * * *